(12) United States Patent
Kamei (10) Patent No.: US 11,698,118 B2
(45) Date of Patent: Jul. 11, 2023

(54) FRICTION MATERIAL AND BRAKE PAD

(71) Applicant: TUNGALOY CORPORATION, Fukushima (JP)

(72) Inventor: Mitsuo Kamei, Iwaki (JP)

(73) Assignee: TUNGALOY CORPORATION, Fukushima (JP)

(*) Notice: Subject to any disclaimer, the term of this patent is extended or adjusted under 35 U.S.C. 154(b) by 313 days.

(21) Appl. No.: 17/118,099

(22) Filed: Dec. 10, 2020

(65) Prior Publication Data

US 2021/0231186 A1 Jul. 29, 2021

(30) Foreign Application Priority Data

Jan. 27, 2020 (JP) .................................. 2020-011047

(51) Int. Cl.
*F16D 69/02* (2006.01)
*F16D 69/00* (2006.01)

(52) U.S. Cl.
CPC ...... *F16D 69/027* (2013.01); *F16D 2069/002* (2013.01); *F16D 2200/0043* (2013.01);
(Continued)

(58) Field of Classification Search
CPC ........... F16D 69/027; F16D 2200/0065; F16D 2200/0069; F16D 2200/0043; F16D 2069/002; F16D 65/00; B22F 3/1103; B22F 3/11; B22F 7/08; C22C 1/051; C22C 3/0084; C22C 3/0089; C22C 23/0228
(Continued)

(56) References Cited

U.S. PATENT DOCUMENTS

2011/0198170 A1* 8/2011 Turani ................ C04B 38/0022
188/250 B
2013/0048448 A1* 2/2013 Hanna ..................... F16D 65/12
164/75
(Continued)

FOREIGN PATENT DOCUMENTS

JP H0586359 A 4/1993
JP 2018150532 A 9/2018
(Continued)

*Primary Examiner* — Robert A. Siconolfi
*Assistant Examiner* — San M Aung
(74) *Attorney, Agent, or Firm* — Studebaker & Brackett PC (57) ABSTRACT

The present invention provides a friction material and a brake pad having excellent wear resistance while exhibiting a high friction coefficient under high-temperature and high-speed conditions. A friction material containing: 40 mass % or more and 80 mass % or less of a matrix containing at least one kind selected from the group consisting of Ni and Fe; 10 mass % or more and 30 mass % or less of inorganic particles containing zircon particles, titania particles, and mullite particles; and 10 mass % or more and 30 mass % or less of a lubricant containing at least one kind selected from the group consisting of graphite, molybdenum disulfide, boron nitride and calcium fluoride, wherein a content of the zircon particles is 30 vol % or more and 36 vol % or less, a content of the titania particles is 30 vol % or more and 36 vol % or less, and a content of the mullite particles is 30 vol % or more and 36 vol % or less with respect to a total content of 100 vol % of the zircon particles, the titania particles, and the mullite particles.

9 Claims, 1 Drawing Sheet

(52) U.S. Cl.
CPC ............... *F16D 2200/0065* (2013.01); *F16D 2200/0069* (2013.01)

(58) Field of Classification Search
USPC ..................................................... 188/251 M
See application file for complete search history.

(56) References Cited

U.S. PATENT DOCUMENTS

| | | | |
|---|---|---|---|
| 2017/0284491 A1* | 10/2017 | Unno | F16D 69/0408 |
| 2018/0017122 A1* | 1/2018 | Dong | F16D 69/026 |
| 2018/0066168 A1* | 3/2018 | Kamei | C22C 32/0005 |
| 2019/0353217 A1* | 11/2019 | Kerssemakers | C03C 25/50 |
| 2019/0368563 A1* | 12/2019 | Miller Higgins | F16D 69/026 |
| 2020/0038959 A1* | 2/2020 | Kubota | C22C 32/0084 |
| 2020/0263750 A1 | 8/2020 | Terao et al. | |

FOREIGN PATENT DOCUMENTS

| | | | |
|---|---|---|---|
| WO | 2013/125717 A1 | 8/2013 | |
| WO | 2016159341 A1 | 10/2016 | |

\* cited by examiner

FRICTION MATERIAL AND BRAKE PAD

TECHNICAL FIELD

The present invention relates to friction materials and brake pads.

BACKGROUND ART

Friction materials are used in clutches or brakes for arbitrarily controlling the rotation or movement of various machines such as machine tools, construction machines, agricultural machines, automobiles, two wheeled vehicles, railways, aircraft and ships. For example, in PTL 1, a friction material containing copper as a metal component is known as a friction material having a high friction coefficient. As the prior art, there is a friction material containing Cu contained in a matrix as a main component and further containing one or more elements selected from Sn, Zn, Ni, Fe, and Co.

PTL 2 discloses a sintered friction material for a brake, containing a metal matrix of Ni or Ni and less than 10 vol % of Fe, a solid lubricant (a), and a friction modifier (b), wherein the friction modifier (b) contains metal or alloy particles (b1) of one or more selected from W, Mo, Cr, and FeW and having an average particle diameter of 50 μm or more and inorganic particles (b2) of one or more selected from oxides, nitrides, carbides, and intermetallic compounds, and an average particle diameter db1 of the metal or the alloy particles (b1) and an average particle diameter db2 of the inorganic particles (b2) satisfy db1<db2.

PTL 3 discloses a friction material containing: 40 mass % or more and 80 mass % or less of at least one matrix selected from the group consisting of metals, alloys, metal compounds, and intermetallic compounds; 5 mass % or more and 30 mass % or less of at least one kind of inorganic particles selected from the group consisting of carbides, nitrides, oxides, and sulfides of at least one element selected from the group consisting of Ti, Zr, Hf, V, Nb, Ta, Cr, Mo, W, Al, Mg, and Si; and 5 mass % or more and 40 mass % or less of at least one lubricant selected from the group consisting of graphite, molybdenum disulfide, tungsten disulfide, boron nitride, and calcium fluoride, wherein the matrix contains, as elements, at least 20 mass % or more and 50 mass % or less of Fe, 0.05 mass % or more and 5.0 mass % or less of P, and 40 mass % or more and 75 mass % or less of Ni with respect to the total amount of the matrix, and the content of Cu as an element is 15 mass % or less with respect to the total amount of the matrix.

CITATION LIST

Patent Literature

PTL 1: JP-A-5-86359
PTL 2: JP-A-2018-150532
PTL 3: International Publication No. WO 2016/159341

SUMMARY OF INVENTION

Technical Problem

In the case where the friction material is used for a clutch or a brake, since the friction material repeatedly performs sudden braking at high speed, the temperature of the friction material may become high. However, since the friction material disclosed in PTL 1 contains copper as a main component, when the temperature becomes high (700° C. or higher), the copper as the main component starts to soften, and the wear rapidly increases or the braking force is rapidly lost (fade). Therefore, a material that can withstand high temperatures is desired as a matrix instead of copper.

Since the friction material disclosed in PTL 2 does not contain titania particles, the friction coefficient and wear resistance may be insufficient.

In the friction material disclosed in PTL 3, an oxidized adhesive film may be formed on the surface of the brake disc under high-temperature and high-speed conditions, and the friction coefficient may decrease.

Accordingly, it is an object of the present invention to provide a friction material and a brake pad having excellent wear resistance while exhibiting a high friction coefficient under high-temperature and high-speed conditions.

Solution to Problem

The present invention is as shown in the following [1] to [9].

[1] A friction material containing: 40 mass % or more and 80 mass % or less of a matrix containing at least one kind selected from the group consisting of Ni and Fe; 10 mass % or more and 30 mass % or less of inorganic particles containing zircon particles, titania particles, and mullite particles; and 10 mass % or more and 30 mass % or less of a lubricant containing at least one kind selected from the group consisting of graphite, molybdenum disulfide, boron nitride, and calcium fluoride, wherein a content of the zircon particles is 30 vol % or more and 36 vol % or less, a content of the titania particles is 30 vol % or more and 36 vol % or less, and a content of the mullite particles is 30 vol % or more and 36 vol % or less with respect to a total content of 100 vol % of the zircon particles, the titania particles, and the mullite particles.

[2] The friction material according to [1], wherein the friction material has a porosity of 14 vol % or more and 30 vol % or less.

[3] The friction material according to [1] or [2], wherein the matrix is formed of a material containing particles having an average particle diameter of 1 μm or more and less than 50 μm.

[4] The friction material according to any of [1] to [3], wherein the matrix contains 0.20 mass % or more and 1.00 mass % or less of P with respect to 100 mass % of the matrix.

[5] The friction material according to any of [1] to [4], wherein the matrix contains Ni and Fe.

[6] The friction material according to any of [1] to [5], wherein the total content of the zircon particles, the titania particles, and the mullite particles is 80 mass % or more with respect to a total amount of the inorganic particles.

[7] The friction material according to any of [1] to [6], wherein the zircon particles have an average particle diameter of 10 μm or more and 600 μm or less, the titania particles have an average particle diameter of 10 μm or more and 600 μm or less, and the mullite particles have an average particle diameter of 10 μm or more and 600 μm or less.

[8] The friction material according to any of [1] to [7], wherein the lubricant contains graphite or contains graphite and calcium fluoride.

[9] A brake pad containing the friction material according to any of [1] to [8].

Advantageous Effects of Invention

According to the present invention, it is possible to provide a friction material and a brake pad having excellent wear resistance while exhibiting a high friction coefficient under high-temperature and high-speed conditions.

DESCRIPTION OF EMBODIMENTS

Figure 1:
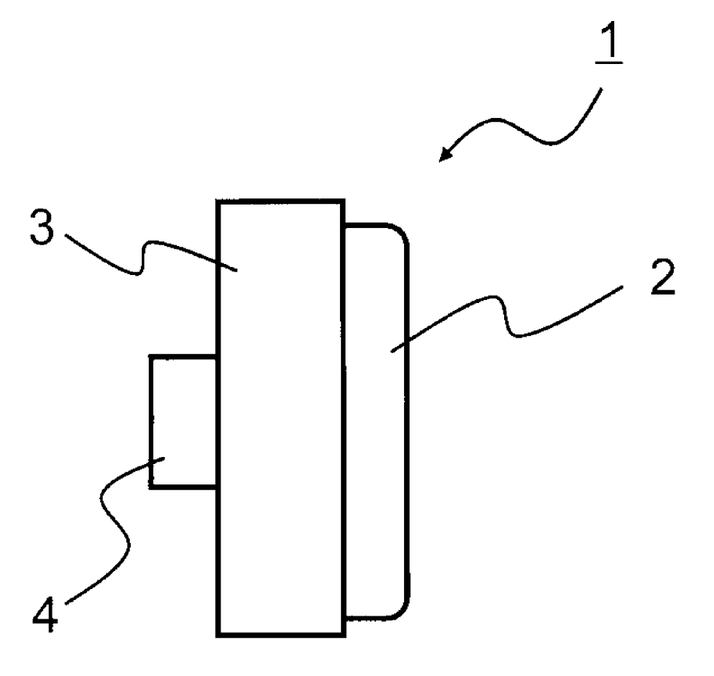
The FIGURE is a schematic side view of a brake pad of the present embodiment.

Hereinafter, an embodiment of the present invention (hereinafter, referred to as "the present embodiment") will be described in detail with reference to the drawing as necessary. However, the present invention is not limited thereto, and various modifications can be made without departing from the scope of the present invention. In the drawing, the same elements are denoted by the same reference numerals, and redundant descriptions thereof will be omitted. In addition, unless otherwise specified, positional relationships such as up, down, left, and right are based on the positional relationships shown in the drawing. Further, the dimensional ratios in the drawing are not limited to the ratios shown in the drawing.

[Friction Material]

The friction material according to the present embodiment contains 40 mass % or more and 80 mass % or less of a matrix, 10 mass % or more and 30 mass % or less of inorganic particles, and 10 mass % or more and 30 mass % or less of a lubricant. The matrix in the present embodiment contains at least one kind selected from the group consisting of Ni and Fe. The inorganic particles in the present embodiment contain zircon particles, titania particles, and mullite particles. In addition, the lubricant in the present embodiment contains at least one kind selected from the group consisting of graphite, molybdenum disulfide, boron nitride, and calcium fluoride. Further, the content of the zircon particles is 30 vol % or more and 36 vol % or less, the content of the titania particles is 30 vol % or more and 36 vol % or less, and the content of the mullite particles is 30 vol % or more and 36 vol % or less with respect to 100 vol % of the total content of the zircon particles, the titania particles, and the mullite particles. As described above, according to the present invention, it is possible to provide a friction material and a brake pad having excellent wear resistance while exhibiting a high friction coefficient under high-temperature and high-speed conditions.

<Matrix>

The matrix of the present embodiment contains at least one kind selected from the group consisting of Ni and Fe. The matrix in the present embodiment has a role of holding other particles. When the matrix contains Ni, the mechanical strength of the friction material is improved. When the matrix contains Fe, the friction characteristics of the friction material are improved. From such a viewpoint, the matrix preferably contains Ni and Fe. The matrix of the present embodiment preferably consists essentially of at least one kind selected from the group consisting of Ni, Fe, W, and P. The term "consist essentially of" means that the content of the component is 99 mass % or more. More preferably, the matrix consists essentially of Ni and Fe or consists essentially of Ni and Fe and at least one kind selected from the group consisting of W and P.

The content of Ni is preferably 70 mass % or more and 99.9 mass % or less, more preferably 72 mass % or more and 99.0 mass % or less, and still more preferably 74 mass % or more and 95 mass % or less with respect to 100 mass % of the matrix. When the content of Ni is 70 mass % or more, the strength of the friction material is improved.

The content of Fe is preferably 0.1 mass % or more and 30 mass % or less, more preferably 0.5 mass % or more and 20 mass % or less, and still more preferably 1.0 mass % or more and 10 mass % or less with respect to 100 mass % of the matrix. When the content of Fe is 0.1 mass % or more, the friction material becomes appropriately sparse and the friction coefficient becomes high. When the content of Fe is 30 mass % or less, sinterability is improved and the mechanical strength of the friction material can be increased.

When the matrix contains P, the sinterability of the friction material is improved, whereby the friction material is excellent in friction characteristics and mechanical strength. The content of P is preferably 0.1 mass % or more and 1.0 mass % or less, more preferably 0.2 mass % or more and 0.8 mass % or less, and still more preferably 0.4 mass % or more and 0.6 mass % or less with respect to 100 mass % of the matrix. When the content of P is 0.1 mass % or more, it is possible to prevent a decrease in mechanical strength of the friction material due to a decrease in sinterability. When the content of P is 1.0 mass % or less, it is possible to prevent the liquid phase from exuding from the friction material during sintering, and the friction material from being significantly deformed.

The ratio of the contents of Fe and P to the content of Ni in the matrix, [(Fe+P)/Ni], is preferably 0.010 or more and 1.2 or less. When the ratio of the contents of Fe and P to the content of Ni is 0.010 or more, the friction coefficient tends to be high, and when the ratio is 1.2 or less, the mechanical strength of the friction material tends to be improved. From the same viewpoint, the ratio [(Fe+P)/Ni] is more preferably 0.012 or more and 1.0 or less, and still more preferably 0.015 or more and 0.5 or less.

When the matrix contains W, the force of scratching the brake disc is increased and the wear resistance is improved. The content of W is preferably 1 mass % or more and 20 mass % or less, more preferably 3 mass % or more and 15 mass % or less, and still more preferably 6 mass % or more and 12 mass % or less with respect to 100 mass % of the matrix. When the content of W is 1 mass % or more, the force of scratching the brake disc is increased, and the wear resistance is improved. When the content of W is 20 mass % or less, it is possible to suppress an increase in aggressiveness to the brake disc.

The ratio of the contents of Fe and W to the content of Ni in the matrix, [(Fe+W)/Ni], is preferably 0.02 or more and 0.50 or less. When the ratio of the contents of Fe and W to the content of Ni is 0.02 or more, the friction coefficient tends to be improved by the adhesive force of Fe, and the wear resistance tends to be improved by the force of scratching the brake disc by W. When the ratio is 0.50 or less, the adhesion abnormality due to Fe and the increase in the aggressiveness to the brake disc tend to be suppressed. From the same viewpoint, the ratio [(Fe+W)/Ni] is preferably 0.04 or more and 0.40 or less, and more preferably 0.06 or more and 0.30 or less.

The matrix of the present embodiment may further contain Si. When the matrix contains Si, the formation of an oxide film can be prevented, and thus the wear resistance can be further improved. The content of Si is preferably 0.5 mass % or more and 3 mass % or less, more preferably 1 mass % or more and 3 mass % or less, and still more preferably 2 mass % or more and 3 mass % or less. When the content of Si is 0.5 mass % or more, the effect of suppressing the formation of an oxide film can be more effectively and reliably obtained. In addition, the friction coefficient tends to be further increased as the size of the pores in the friction material increases. On the other hand, when the content of Si is 3 mass % or less, the adhesion to a member to be joined (for example, a back plate that holds a friction member) is further increased, and thus peeling therebetween tends to be further suppressed.

The matrix of the present embodiment may further contain Mn. When the matrix contains Mn, the formation of an oxide film can be prevented, and thus the wear resistance can be further improved. The content of Mn is preferably 0.5 mass % or more and 15 mass % or less, more preferably 3 mass % or more and 10 mass % or less, and still more preferably 5 mass % or more and 8 mass % or less. When the content of Mn is 0.5 mass % or more, the effect of suppressing the formation of an oxide film is further improved, and thus the friction coefficient tends to be increased. When the content of Mn is 15 mass % or less, the interposition of unreacted Mn is further suppressed, and thus the decrease in the adhesion of the friction material tends to be further prevented.

In the matrix of the present embodiment, the content of Cu is preferably 15 mass % or less with respect to the total amount of the matrix. When the content of Cu is 15 mass % or less, the friction coefficient is less likely to decrease even when the temperature of the friction material is increased. This is because the ductility of the friction material is reduced and plastic flow is less likely to occur due to the heat generated during braking or intermittent operation. In addition, when the content of Cu is 15 mass % or less, it is possible to obtain a friction material using a raw material powder in which a load on the environment due to inflow of Cu into a river or the sea, the Cu falling from a friction member due to wear during braking or intermittent operation, or the like, is further reduced.

The content of Cu is preferably 10 mass % or less, more preferably 5 mass % or less, and still more preferably 1 mass % or less.

The matrix of the present embodiment is made of a metal or an alloy. Among these, an alloy having the above-mentioned composition is preferable.

The friction material of the present embodiment contains the matrix in an amount of 40 mass % or more and 80 mass % or less with respect to the total amount of the friction material. In the present embodiment, when the content of the matrix is 40 mass % or more, it is possible to prevent the inorganic particles and the lubricant from falling off during the above-mentioned braking or intermittent operation, and it is possible to suppress a decrease in wear resistance. In addition, it is also possible to improve adhesion to a member intended to be joined to the friction member made of the friction material by sintering (hereinafter, referred to as a "member to be joined", for example, a back plate that holds a friction member). On the other hand, when the content of the matrix of the present embodiment is 80 mass % or less, the friction material can be prevented from becoming too dense, and the friction coefficient can be increased. The content of the matrix is preferably 45 mass % or more and 76 mass % or less, and more preferably 49 mass % or more and 76 mass % or less.

The matrix is preferably formed of a material containing particles having an average particle diameter of 1 μm or more and 50 μm or less. When the matrix is formed of a material containing particles having an average particle diameter of 1 μm or more and 50 μm or less, the friction coefficient and wear resistance are improved.

<Inorganic Particles>

The inorganic particles are preferably hard inorganic particles.

In the present embodiment, the inorganic particles include zircon particles, titania particles, and mullite particles. The content of the inorganic particles in the friction material of the present embodiment is 10 mass % or more and 30 mass % or less with respect to the total amount of the friction material. By including the inorganic particles containing these particles in the above range, the friction material according to the present embodiment exhibits an excellent friction coefficient and excellent wear resistance under high-temperature and high-speed conditions. The titania particles are not particularly limited, and examples thereof include rutile particles, anatase particles, and brookite particles. Of these, rutile particles are preferred.

In the present embodiment, the content of the zircon particles is 30 vol % or more and 36 vol % or less, the content of the titania particles is 30 vol % or more and 36 vol % or less, and the content of the mullite particles is 30 vol % or more and 36 vol % or less with respect to 100 vol % of the total content of the zircon particles, the titania particles, and the mullite particles. When the inorganic particles contain these particles in the above-mentioned volume ratio, the friction material according to the present embodiment exhibits an excellent friction coefficient and excellent wear resistance under high-temperature and high-speed conditions.

From the same viewpoint, the content of the zircon particles is preferably 31 vol % or more and 35 vol % or less, and more preferably 32 vol % or more and 34 vol % or less with respect to 100 vol % of the total content of the zircon particles, the titania particles, and the mullite particles.

From the same viewpoint, the content of the titania particles is preferably 31 vol % or more and 35 vol % or less, and more preferably 32 vol % or more and 34 vol % or less with respect to 100 vol % of the total content of the zircon particles, the titania particles, and the mullite particles.

From the same viewpoint, the content of the mullite particles is preferably 31 vol % or more and 35 vol % or less, and more preferably 32 vol % or more and 34 vol % or less with respect to 100 vol % of the total content of the zircon particles, the titania particles, and the mullite particles.

In the present embodiment, the content (vol %) of each of the inorganic particles is measured by the method described in Examples.

The total content of the zircon particles, the titania particles, and the mullite particles in the friction material of the present embodiment is preferably 80 mass % or more, more preferably 90 mass % or more, and still more preferably 95 mass % or more with respect to the total amount of the inorganic particles. When the total content is within this range, the friction coefficient and wear resistance can be further improved.

The average particle diameter of the zircon particles is preferably 10 μm or more and 600 μm or less, more preferably 50 μm or more and 300 μm or less, and still more preferably 100 μm or more and 200 μm or less. When the average particle diameter of the zircon particles is within this range, the zircon particles are less likely to fall off and are favorably held in the metal matrix, and the friction coefficient and wear resistance can be further improved.

The average particle diameter of the titania particles is preferably 10 μm or more and 600 μm or less, more preferably 50 μm or more and 300 μm or less, and still more preferably 100 μm or more and 200 μm or less. When the average particle diameter of the titania particles is within this range, the titania particles are less likely to fall off and are favorably held in the metal matrix, and the friction coefficient and wear resistance can be further improved.

The average particle diameter of the mullite particles is preferably 10 μm or more and 600 μm or less, more preferably 50 μm or more and 300 μm or less, and still more preferably 100 μm or more and 200 μm or less. When the average particle diameter of the mullite particles is within this range, the mullite particles are less likely to fall off and are favorably held in the metal matrix, and the friction coefficient and wear resistance can be further improved.

In the present embodiment, the average particle diameter of the inorganic particles is measured by the method described in Examples.

The total content of the inorganic particles is preferably 13 mass % or more and 25 mass % or less, and more preferably 15 mass % or more and 20 mass % or less with respect to the total amount of the friction material. When the content of the inorganic particles is within the above-described range, the friction coefficient and wear resistance are further improved.

The friction material of the present embodiment may contain, as other inorganic particles, particles of at least one kind selected from the group consisting of carbides, nitrides, and oxides (excluding zircon particles, titania particles, and mullite particles) of at least one element selected from the group consisting of Ti, Zr, Hf, V, Nb, Ta, Cr, Mo, W, Al, Mg, and Si. Examples of other inorganic particles include aluminum oxide ($Al_2O_3$), zirconia ($ZrO_2$), silica ($SiO_2$), magnesium oxide (MgO), and tungsten carbide (WC).

The content of the other inorganic particles is preferably 10 mass % or less, more preferably 5 mass % or less, and still more preferably 1 mass % or less with respect to the total amount of the friction material.

<Lubricant>

The friction material of the present embodiment contains at least one lubricant selected from the group consisting of graphite (C), molybdenum disulfide ($MoS_2$), boron nitride (BN), and calcium fluoride ($CaF_2$). The content of the lubricant is 10 mass % or more and 30 mass % or less with respect to the total amount of the friction material. By including the lubricant in the above-described content, the friction material according to the present embodiment exhibits an excellent friction coefficient and excellent wear resistance under high-temperature and high-speed conditions. In addition, when the lubricant is contained in the above-described content, it is possible to suppress the squeal and judder that occur during the above-mentioned braking or intermittent operation. Among these, graphite or calcium fluoride is preferable, and graphite or graphite and calcium fluoride are more preferable.

When the friction material contains graphite and calcium fluoride, the mass ratio of graphite to calcium fluoride (graphite/calcium fluoride) is preferably 70/30 or more and 98/2 or less, more preferably 75/25 or more and 95/5 or less, and still more preferably 80/20 or more and 90/10 or less. When the mass ratio of graphite to calcium fluoride is within the above-described range, the friction coefficient and wear resistance are further improved.

The content of the lubricant is preferably 10 mass % or more and 30 mass % or less, more preferably 15 mass % or more and 28 mass % or less, and still more preferably 18 mass % or more and 25 mass % or less with respect to the total amount of the friction material.

The friction material of the present embodiment may contain a friction modifier. The friction modifier is not particularly limited, and examples thereof include talc ($Mg_3Si_4O_{10}(OH)_2$), mica, calcium carbonate ($CaCO_3$), and coke (C). By containing the friction modifier, it is possible to more effectively and reliably adjust the friction coefficient and the mechanical strength of the friction material during the above-mentioned braking or intermittent operation.

<Porosity>

The porosity of the friction material is preferably 14 vol % or more and 30 vol % or less. When the porosity is within the above-described range, the friction coefficient can be further improved, and the wear resistance tends to be further improved. The porosity of the friction material is more preferably 15 vol % or more and 25 vol % or less, and still more preferably 17 vol % or more and 20 vol % or less. The porosity is measured by the method described in Examples.

The ratio of the composition in the friction material of the present embodiment and the ratio of each element in the matrix can be obtained as follows. The surface of the friction material is polished, and the structure of the polished surface can be measured by an energy dispersive X-ray spectrometer (EDS) attached to a scanning electron microscope (SEM). The structure of the friction material is magnified 50 times to 2000 times by SEM, and the ratio of the composition in the friction material can be determined by EDS. In addition, the ratio of each element in the matrix can be determined by EDS by magnifying the structure of the friction material 3000 times to 10000 times by SEM so as not to contain inorganic particles or a lubricant.

[Manufacturing Method of Friction Material]

The method for manufacturing the friction material of the present embodiment is not particularly limited, and examples thereof include the following steps (A) to (E).

Step (A): a step of formulating 40 mass % or more and 80 mass % or less of a metal powder constituting a matrix, 10 mass % or more and 30 mass % or less of an inorganic particle powder containing zircon particles, titania particles, and mullite particles, 10 mass % or more and 30 mass % or less of a lubricant powder, and 1 mass % or more and 20 mass % or less of a friction modifier powder as an optional component, wherein the total is 100 mass %, the content of zircon particles is 30 vol % or more and 36 vol % or less, the content of titania particles is 30 vol % or more and 36 vol % or less, and the content of mullite particles is 30 vol % or more and 36 vol % or less with respect to 100 vol % of the total content of zircon particles, titania particles and mullite particles;

Step (B): a mixing step of mixing the formulated raw material powders to prepare a mixture;

Step (C): a molding step of molding the obtained mixture into a shape of a predetermined friction material to obtain a molded body;

Step (D): a sintering step of overlaying the molded body obtained in step (C) and a member to be joined (for example, a metal back plate) holding the molded body, and then sintering the resulting product; and Step (E): a polishing step of polishing the surface of the sintered body which has undergone step (D) so as to have a predetermined dimension. Instead of the above-mentioned metal powder, an alloy powder, a metal compound powder, or an intermetallic compound powder may be used.

It should be noted that the average particle diameter of the raw material powder used in step (A) is measured by the Fisher method (Fisher Sub-Sieve Sizer (FSSS)) described in standard B330 of the American Society for Testing and Materials (ASTM).

In step (A), each composition can be adjusted by formulating, as raw material powders of the friction material of the present embodiment, 40 mass % or more and 80 mass % or less of a metal powder constituting a matrix, 10 mass % or more and 30 mass % or less of an inorganic particle powder, 10 mass % or more and 30 mass % or less of a lubricant powder, and 1 mass % or more and 20 mass % or less of a friction modifier powder as necessary. Instead of the above-mentioned metal powder, an alloy powder, a metal compound powder, or an intermetallic compound powder may be used.

In step (A), for example, a material containing particles having an average particle diameter of 1 μm or more and 50 μm or less is preferably used as a raw material of the matrix. More specifically, in step (A), for example, 1 mass % or more and 20 mass % or less of Fe powder having an average particle diameter of 1 μm or more and 50 μm or less (preferably 5 μm or more and 40 μm or less) and 80 mass % or more and 99 mass % or less of Ni powder having an average particle diameter of 1 μm or more and 50 μm or less (preferably 1 μm or more and 5.0 μm or less) may be formulated with respect to the total amount of the matrix. In order to set the ratio of the contents of Fe and P [(Fe+P)/Ni] in the matrix at 0.010 or more and 1.2 or less, an Fe powder containing P may be used as the Fe powder. In order to set the ratio of the contents of Fe and W [(Fe+W)/Ni] in the matrix at 0.02 or more and 0.50 or less, an Fe powder containing W may be used as the Fe powder.

It is more preferable to use, as the Fe component in the metal powder used in the manufacturing of the friction material of the present embodiment, an iron-based metal powder containing 85 mass % or more of an Fe element manufactured by one or both of a carbonyl iron powder method and an atomizing (spraying) method because the mechanical strength of the friction material is further improved.

Specific examples of the iron-based metal powder manufactured by the carbonyl iron powder method include a carbonyl iron powder containing an Fe element. Specific examples of the iron-based metal powder manufactured by the above-mentioned atomizing method include a phosphorus-containing iron powder composed of 0.3 mass % or more and 15 mass % or less of a P element and the balance of an Fe element. Among them, a phosphorus-containing iron powder composed of 0.5 mass % or more and 10.0 mass % or less of a P element and the balance of an Fe element is more preferable.

As the Cu component of the metal powder used in the manufacturing of the friction material of the present embodiment, for example, a metal powder made of Cu may be used.

As the Si component and the Mn component of the metal powder used in the manufacturing of the friction material of the present embodiment, for example, a metal powder made of Si and a metal powder made of Mn may be used. As the other Si component, for example, a silicon-based metal powder composed of Si and other metal elements (the content of Si is usually 80 mass % or more) may be used. In the present invention, Si is included in the metal.

For example, specific examples of the silicon-based metal powder containing 80 mass % or more of the Si element include a metal silicon powder composed of the Si element and a ferrosilicon powder composed of 80 mass % or more of the Si element and the balance of the Fe element.

In step (B), the average particle diameter of each raw material powder can be adjusted, or a mixed powder having a predetermined formulating composition can be uniformly mixed.

In step (C), the obtained mixture can be molded into a predetermined shape of friction material.

In step (D), the molded body obtained through step (C) and a member to be joined, for example, a metal back plate for holding the molded body are overlaid and then sintered, whereby it is possible to obtain the two effects of sintering of the molded body and adhesion between the molded body and the member to be joined. Preferably, when sintering is performed at a temperature in the range of 750° C. or higher and 1100° C. or lower for 0.5 hours or more and 2 hours or less, the molded body becomes dense, and the mechanical strength is thus increased. Further, the adhesion between the molded body and the member to be joined is increased. In order to improve the wear resistance of the friction material, it is preferable that an Ar gas atmosphere is used during sintering and a pressurizing condition of 0.1 to 5 MPa is used for the molded body.

In step (E), the dimensions of the sintered body can be adjusted by polishing the sintered body obtained through step (D).

The friction material of the present embodiment can be used as a material for a molded member such as a clutch or a brake that arbitrarily controls rotation or movement of various machines such as machine tools, construction machines, agricultural machines, automobiles, two wheeled vehicles, railways, aircraft, and ships. The friction material of the present embodiment is excellent in friction coefficient and wear resistance under high-temperature and high-speed conditions, and thus is suitably used as a friction material for a two wheeled vehicle for racing.

[Brake Pad]

The brake pad of the present embodiment contains the friction material according to the present embodiment. The brake pad is disposed on the friction surface of the friction material according to the present embodiment. The friction material according to the present embodiment is excellent in friction coefficient and wear resistance under high-temperature and high-speed conditions, and thus is excellent in braking performance during high-speed operation.

The FIGURE is a schematic side view of the brake pad of the present embodiment. A brake pad 1 of the present embodiment includes a pad portion 2 made of the friction material of the present embodiment, a support body 3 supporting the pad portion 2, and a connecting portion 4 provided on the support body. The brake pad 1 is attached to a brake of a bicycle by the connecting portion 4.

The friction material of the present embodiment can use a raw material powder having a small load on the environment, and thus has a small load on the environment. Further, since the friction material of the present embodiment is excellent in sinterability, it is excellent in adhesion to a member to be joined such as a metal back plate and has a high friction coefficient. In addition, the friction material of the present embodiment has a high friction coefficient even when the temperature of the friction material becomes high during the above-mentioned braking or intermittent operation. More specifically, the friction material of the present embodiment has a high friction coefficient equal to or higher than that of a conventional friction material containing copper as a main component.

EXAMPLES

Hereinafter, the present invention will be described more specifically with reference to examples. The present invention is not limited to the following examples.

<Average Particle Diameter>

The average particle diameter of the raw material powder was measured by the Fisher method (Fisher Sub-Sieve Sizer (FSSS)) described in standard B330 of the American Society for Testing and Materials (ASTM).

<Porosity>

A sample having a width of 25 mm and a length of 25 mm was cut out from the friction material, and each end face (25 mm square face) was smoothly finished to sufficiently remove polishing powder. The sample was left in a desiccator for at least 24 hours. The width, length, and thickness of the sample were measured to determine an apparent volume V of the test piece. The mass m1 of the sample was measured. The sample was placed in a container containing oil having a density of p and held at 90±10° C. for 8 hours. The oil conforms to the regulations of Appendix 1, Table 2 of JIS D4418:1996. Thereafter, the sample was immersed in the oil and left to stand for 12 hours or more until the oil reached room temperature. The sample was taken out from the oil and rolled four or five times on a piece of cloth to remove the oil on the surface of the sample. The mass m2 of the sample was measured. The porosity was calculated from the following formula.

$$p=\{(m2-m1)/\rho\}\times\{1/V\}\times 100$$

(In the formula, p represents a porosity (vol %), m1 represents a mass (g) of the test piece, m2 represents a mass (g) of the test piece having absorbed the oil, ρ represents a density (g/cm$^3$) of the oil, and V represents a volume (cm$^3$) of the test piece.)

<Ratio of Inorganic Particles (vol %)>

First, substances contained in the friction material were identified by X-ray diffraction measurement. Next, the friction material was observed in the x-direction, the y-direction, and the z-direction with a scanning electron microscope (SEM) and photographed at a magnification of 50 times or less. In addition, each substance was identified from the surface analysis result of each element contained. Then, the taken photograph was subjected to image analysis, and the area ratio of each substance was calculated. The average value of the area ratio of the friction material in each of the x-direction, the y-direction, and the z-direction was calculated, and the area ratio was defined as vol %.

<Average Particle Diameter of Inorganic Particles>

The friction material was observed in the x-direction, the y-direction, and the z-direction with a scanning electron microscope (SEM) and photographed at a magnification of 50 times or less. Then, the taken photograph was subjected to image analysis, and the total area of the inorganic particles was calculated. Next, the number of inorganic particles in the taken photograph is counted. The total area of the friction material in the x-direction, the y-direction, and the z-direction was divided by the number of inorganic particles to calculate an average area per particle. A circle having an area corresponding to the average area was assumed, and the diameter of the circle was defined as the average particle diameter of the inorganic particles. The substances contained in the friction material were identified by X-ray diffraction measurement. In addition, the type of each inorganic particle was specified from the surface analysis result of each element contained.

[Manufacturing of Friction Material]

The raw material powders shown in Table 1 were weighed so as to have a predetermined formulating amount, and were mixed by a mixer. The obtained mixture was molded into a shape of a brake pad to obtain a molded body. The obtained molded body and a back plate obtained by plating the surface of a steel plate with copper were overlaid on each other and subjected to pressure sintering at a sintering temperature and a sintering pressure shown in Table 1 to obtain a friction material sample. At this time, sintering was carried out by holding in an Ar atmosphere for one hour. The average particle diameter of the inorganic particles in Table 1 is an average particle diameter measured by the above-mentioned method.

TABLE 1

| | | | Average particle diameter [μm] | Invention Sample | | | | | |
|---|---|---|---|---|---|---|---|---|---|
| | | | | 1 | 2 | 3 | 4 | 5 | 6 |
| Raw material powder composition (mass %) | Matrix component | Ni | 3 | 56.0 | 52.5 | 53.5 | 62.0 | 44.5 | 50.2 |
| | | FeP | 40 | | | 2.5 | 6.7 | | 8.1 |
| | | Cu | 40 | | | | | | |
| | | Mn | 40 | | | | | | |
| | | Sn | 40 | | | | | | |
| | | An | 50 | | | | | | |
| | | FeW | 40 | 5.0 | 8.5 | 4.8 | 7.0 | 5.3 | 9.2 |
| | | FeSi | 100 | | | | | | |
| | | SUS | 40 | | | | | | |
| | | Total of Matrix | | 61.0 | 61.0 | 60.8 | 75.7 | 49.8 | 67.5 |
| | Inorganic particle component | Zircon particle | 150 | 7.2 | 7.3 | 7.4 | 5.2 | 10.0 | 4.5 |
| | | Titania particle | 110 | 6.6 | 6.6 | 6.8 | 4.6 | 9.5 | 4.0 |
| | | Mullite particle | 150 | 4.9 | 4.9 | 5.1 | 3.5 | 7.2 | 3.3 |
| | | SiO$_2$ particle | 400 | | | | | | |
| | | SiC particle | 8 | | | | | | |
| | | Total of Inorganic particle | | 18.7 | 18.8 | 19.3 | 13.3 | 26.7 | 11.8 |
| | Lubricant component | CaF$_2$ | 150 | 2.8 | 3.0 | 2.7 | 1.7 | 6.5 | 2.6 |
| | | Graphite | 300 | 17.5 | 17.2 | 17.2 | 9.3 | 17.0 | 18.1 |
| | | Total of Lubricant | | 20.3 | 20.2 | 19.9 | 11.0 | 23.5 | 20.7 |
| | Friction modifier component | Mica | 150 | | | | | | |
| | | Coke | 300 | | | | | | |
| | | Total of Friction modifier | | 0.0 | 0.0 | 0.0 | 0.0 | 0.0 | 0.0 |
| Manufacturing condition | | Sintering temperature [° C.] | | 750 | 950 | 900 | 1000 | 850 | 800 |
| | | Sintering pressure [MPa] | | 2 | 1 | 2 | 3 | 1 | 4 |

TABLE 1-continued

| | | | Average particle diameter [μm] | Comparative Sample 1 | 2 | 3 | 4 | 5 | 6 | 7 | 8 |
|---|---|---|---|---|---|---|---|---|---|---|---|
| Raw material powder composition (mass %) | Matrix component | Ni | 3 | 20.0 | 19.2 | 42.0 | 3.2 | 60.0 | 53.5 | 53.5 | 53.5 |
| | | FeP | 40 | | 3.7 | | | 10.2 | 2.5 | 2.5 | 2.5 |
| | | Cu | 40 | 28.0 | 23.2 | 8.2 | 64.3 | | | | |
| | | Mn | 40 | | 6.2 | 3.2 | | | | | |
| | | Sn | 40 | 2.5 | 3.5 | 2.4 | 4.5 | 2.0 | | | |
| | | An | 50 | | 5.2 | 3.5 | | 3.0 | | | |
| | | FeW | 40 | | | | | 3.0 | 4.8 | 4.8 | 4.8 |
| | | FeSi | 100 | 0.5 | | | | | | | |
| | | SUS | 40 | 10.0 | | | | 1.2 | | | |
| | | Total of Matrix | | 61.0 | 61.0 | 59.3 | 72.0 | 79.4 | 60.8 | 60.8 | 60.8 |
| | Inorganic particle component | Zircon particle | 150 | 7.5 | 11.0 | | 5.5 | 5.6 | 10.2 | 9.5 | 6.1 |
| | | Titania particle | 110 | | | 8.2 | 4.5 | 1.2 | | 9.8 | 8.3 |
| | | Mullite particle | 150 | 6.0 | 3.0 | 4.5 | | 3.5 | 9.1 | | 4.9 |
| | | SiO$_2$ particle | 400 | | 3.0 | | | 1.0 | | | |
| | | SiC particle | 8 | 1.8 | | | | | | | |
| | | Total of Inorganic particle | | 15.3 | 17.0 | 12.7 | 10.0 | 11.3 | 19.3 | 19.3 | 19.3 |
| | Lubricant component | CaF$_2$ | 150 | 4.5 | 4.0 | 2.5 | 5.0 | 2.0 | 2.7 | 2.7 | 2.7 |
| | | Graphite | 300 | 19.2 | 10.0 | 15.0 | 8.0 | 3.0 | 17.2 | 17.2 | 17.2 |
| | | Total of Lubricant | | 23.7 | 14.0 | 17.5 | 13.0 | 5.0 | 19.9 | 19.9 | 19.9 |
| | Friction modifier component | Mica | 150 | | 1.2 | 0.5 | 2.0 | 1.8 | | | |
| | | Coke | 300 | | 6.8 | 10.0 | 3.0 | 2.5 | | | |
| | | Total of Friction modifier | | 0.0 | 8.0 | 10.5 | 5.0 | 4.3 | 0.0 | 0.0 | 0.0 |
| Manufacturing condition | | Sintering temperature [° C.] | | 900 | 950 | 900 | 950 | 950 | 900 | 900 | 900 |
| | | Sintering pressure [MPa] | | 1 | 3 | 2 | 3 | 3 | 2 | 2 | 2 |

In Table 1, the meanings of various abbreviations are as follows.
Ni: Nickel metal particles
FeP: Phosphorus-containing iron (94 mass % Fe, 6 mass % P) particles
Cu: Copper metal particles
Mn: Manganese metal particles
Sn: Tin metal particles
Zn: Zinc metal particles
FeW: Tungsten-containing iron (80 mass % tungsten)
FeSi: Silicon-containing iron (60 mass % silicon)
SUS: Stainless steel (18 mass % chromium)
Zircon particle: Zircon sand (ZrSiO$_4$ particle)
Titania particle: rutile sand (>95 mass % rutile type TiO$_2$)
Mullite particle: Mullite
Mica: Mica (KAl$_2$·AlSi$_3$O$_{10}$(OH)$_2$)

The following tests were conducted using samples of the obtained friction material. The results are shown in Table 2.

[Friction Test]
<Friction Coefficient>
Test apparatus: Inertial friction tester
Moment of inertia: 12.25 kgm$^2$
Velocity: 50 m/s
Contact pressure: 980 kPa
Test piece shape: 25 mm×25 mm×10 mm
Brake start temperature: 350° C.

<Wear Amount>
Test apparatus: Inertial friction tester
Moment of inertia: 12.25 kgm$^2$
Velocity: 50 m/s
Contact pressure: 2000 kPa
Test piece shape: 25 mm×25 mm×10 mm
Brake start temperature: 100° C.

TABLE 2

| | | Inventive Sample 1 | 2 | 3 | 4 | 5 | 6 |
|---|---|---|---|---|---|---|---|
| Composition of Each Component (mass %) *1 | Matrix | 61.0 | 61.0 | 60.8 | 75.7 | 49.8 | 67.5 |
| | Hard particle | 18.7 | 18.8 | 19.3 | 13.3 | 26.7 | 11.8 |
| | Lubricant | 20.3 | 20.2 | 19.9 | 11.0 | 23.5 | 20.7 |
| | Friction modifier | 0.0 | 0.0 | 0.0 | 0.0 | 0.0 | 0.0 |
| Composition of Inorganic particle (vol %) *2 | Zircon particle | 33.2 | 33.6 | 33.1 | 33.8 | 32.2 | 32.7 |
| | Titania particle | 33.3 | 33.2 | 33.3 | 32.7 | 33.5 | 31.8 |
| | Mullite particle | 33.4 | 33.2 | 33.7 | 33.6 | 34.3 | 35.4 |
| | P content (mass %) in matrix | 0.00 | 0.00 | 0.25 | 0.53 | 0.00 | 0.72 |
| Test | Porosity [vol %] | 19 | 18 | 17 | 14 | 20 | 17 |
| | Friction coefficient (Condition 1) | 0.62 | 0.72 | 0.75 | 0.65 | 0.71 | 0.65 |
| | Wear amount (Condition 2) | 0.40 | 0.50 | 0.52 | 0.40 | 0.55 | 0.43 |

TABLE 2-continued

| | | Comparative Sample | | | | | | | |
|---|---|---|---|---|---|---|---|---|---|
| | | 1 | 2 | 3 | 4 | 5 | 6 | 7 | 8 |
| Composition of Each Component (mass %) *1 | Matrix | 61.0 | 61.0 | 59.3 | 72.0 | 79.4 | 60.8 | 60.8 | 60.8 |
| | Hard particle | 15.3 | 17.0 | 12.7 | 10.0 | 11.3 | 19.3 | 19.3 | 19.3 |
| | Lubricant | 23.7 | 14.0 | 17.5 | 13.0 | 5.0 | 19.9 | 19.9 | 19.9 |
| | Friction modifier | 0.0 | 8.0 | 10.5 | 5.0 | 4.3 | 0.0 | 0.0 | 0.0 |
| Composition of Inorganic particle (vol %) *2 | Zircon particle | 45.9 | 71.3 | | 52.8 | 46.4 | 43.2 | 47.0 | 27.2 |
| | Titania particle | | | 57.5 | 47.2 | 10.9 | | 53.0 | 40.5 |
| | Mullite particle | 54.1 | 28.7 | 42.5 | | 42.8 | 56.8 | | 32.3 |
| | P content (mass %) in matrix | 0.00 | 0.36 | 0.00 | 0.00 | 0.77 | 0.25 | 0.25 | 0.25 |
| Test | Porosity [vol %] | 18 | 15 | 14 | 13 | 10 | 16 | 19 | 15 |
| | Friction coefficient (Condition 1) | 0.50 | 0.52 | 0.47 | 0.42 | 0.40 | 0.68 | 0.65 | 0.67 |
| | Wear amount (Condition 2) | 0.65 | 0.48 | 0.62 | 0.41 | 0.73 | 0.81 | 0.85 | 0.90 |

*1 An amount (mass %) based on the mass of the entire friction material.
*2 An amount (vol %) based on the total volume of the zircon particles, the titania particles, and the mullite particles.

As described above, according to the comparison between the invention samples and the comparative samples, it is understood that the friction material of the present embodiment is excellent in wear resistance while exhibiting a high friction coefficient under high-temperature and high-speed conditions.

INDUSTRIAL APPLICABILITY

The friction material of the present invention can be used as a material for a molded member such as a clutch or a brake that arbitrarily controls rotation or movement of various machines such as machine tools, construction machines, agricultural machines, automobiles, two wheeled vehicles, railways, aircraft, and ships.

REFERENCE SIGNS LIST

1: Brake pad
2: Pad portion
3: Support body
4: Connecting portion

The invention claimed is:

1. A friction material comprising: 40 mass % or more and 80 mass % or less of a matrix containing at least one kind selected from the group consisting of Ni and Fe; 10 mass % or more and 30 mass % or less of inorganic particles containing zircon particles, titania particles, and mullite particles; and 10 mass % or more and 30 mass % or less of a lubricant containing at least one kind selected from the group consisting of graphite, molybdenum disulfide, boron nitride, and calcium fluoride, wherein a content of the zircon particles is 30 vol % or more and 36 vol % or less, a content of the titania particles is 30 vol % or more and 36 vol % or less, and a content of the mullite particles is 30 vol % or more and 36 vol % or less with respect to a total content of 100 vol % of the zircon particles, the titania particles, and the mullite particles.

2. The friction material according to claim 1, wherein the friction material has a porosity of 14 vol % or more and 30 vol % or less.

3. The friction material according to claim 1, wherein the matrix is formed of a material containing particles having an average particle diameter of 1 μm or more and less than 50 μm.

4. The friction material according to claim 1, wherein the matrix contains 0.20 mass % or more and 1.00 mass % or less of P with respect to 100 mass % of the matrix.

5. The friction material according to claim 1, wherein the matrix contains Ni and Fe.

6. The friction material according to claim 1, wherein a total content of the zircon particles, the titania particles, and the mullite particles is 80 mass % or more with respect to a total amount of the inorganic particles.

7. The friction material according to claim 1, wherein the zircon particles have an average particle diameter of 10 μm or more and 600 μm or less, the titania particles have an average particle diameter of 10 μm or more and 600 μm or less, and the mullite particles have an average particle diameter of 10 μm or more and 600 μm or less.

8. The friction material according to claim 1, wherein the lubricant contains graphite or contains graphite and calcium fluoride.

9. A brake pad comprising the friction material according to claim 1.

* * * * *